No. 885,010. PATENTED APR. 21, 1908.
I. A. BELL.
CAMERA.
APPLICATION FILED AUG. 6, 1906.

3 SHEETS—SHEET 1.

Witnesses
Thos. W. Riley.
Daisy Harrison

Inventor
I. A. Bell
By
W. T. FitzGerald & Co.
Attorneys

No. 885,010. PATENTED APR. 21, 1908.
I. A. BELL.
CAMERA.
APPLICATION FILED AUG. 6, 1906.

3 SHEETS—SHEET 2.

Witnesses
Thos. W. Riley
Daisy Harrison

Inventor
I. A. Bell
By W. J. FitzGerald & Co.
Attorneys

THE NORRIS PETERS CO., WASHINGTON, D. C.

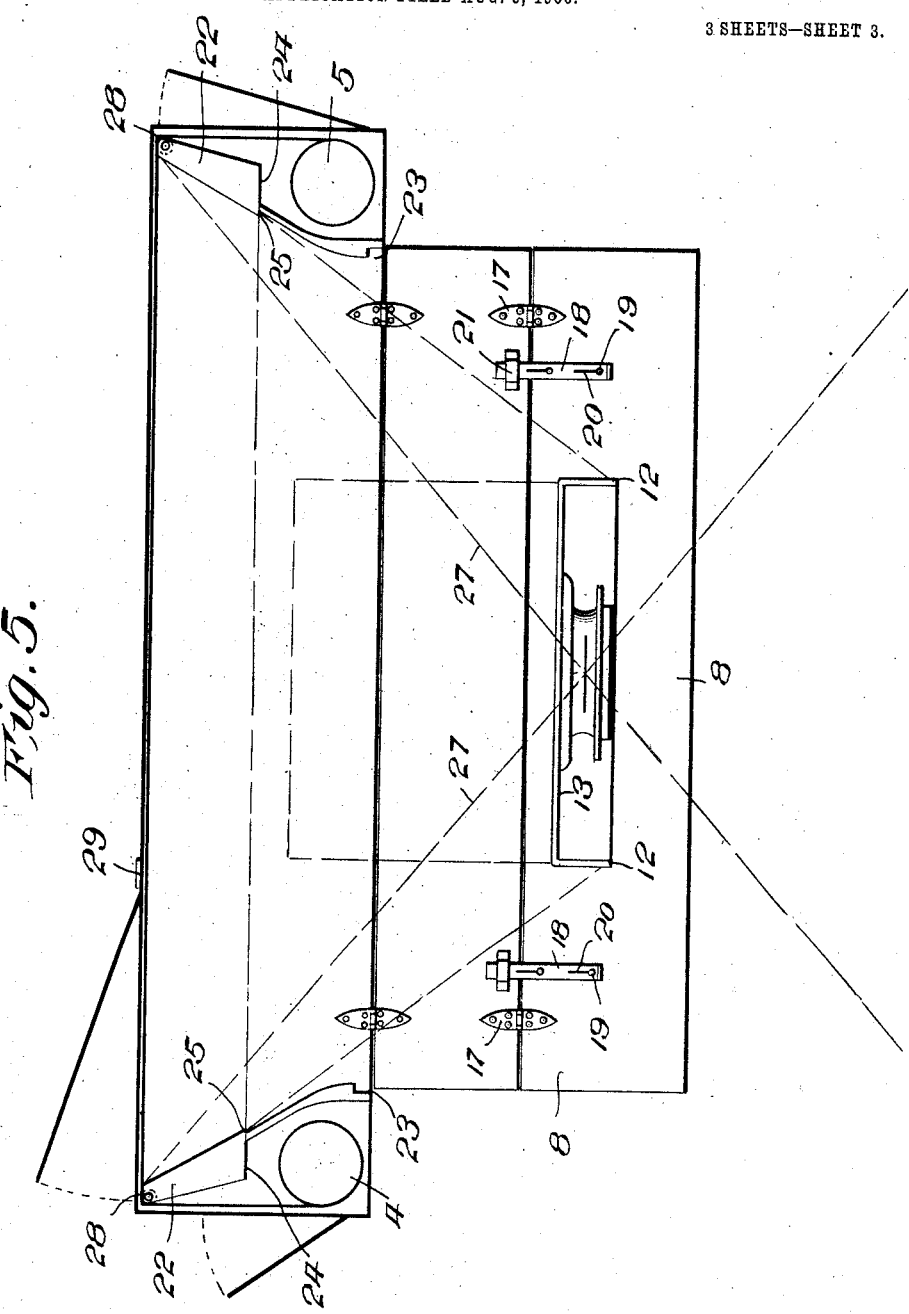

UNITED STATES PATENT OFFICE.

ISAAC A. BELL, OF CEDAR RAPIDS, IOWA.

CAMERA.

No. 885,010.  Specification of Letters Patent.  Patented April 21, 1908.

Application filed August 6, 1906. Serial No. 329,501.

*To all whom it may concern:*

Be it known that I, ISAAC A. BELL, citizen of the United States, residing at Cedar Rapids, in the county of Linn and State of Iowa, have invented certain new and useful Improvements in Cameras; and I do hereby declare the following to be a full, clear, and exact description of the invention, such as will enable others skilled in the art to which it appertains to make and use the same.

My invention relates to new and useful improvements in cameras and more particularly to that class known as folding cameras and in which is adapted to be used sensitized films for taking pictures.

My object is to provide means whereby the capacity of the lens will be increased and a larger picture produced without increasing the size of the camera.

A further object is to provide means for disposing the folds of the bellows out of line with the rays of light through the lens.

A still further object is to provide means for disposing a portion of the extension-bed below the line of focus of the lens when a short focus is being made.

Other objects and advantages will be hereinafter referred to and more particularly pointed out in the claims.

Figure 1:
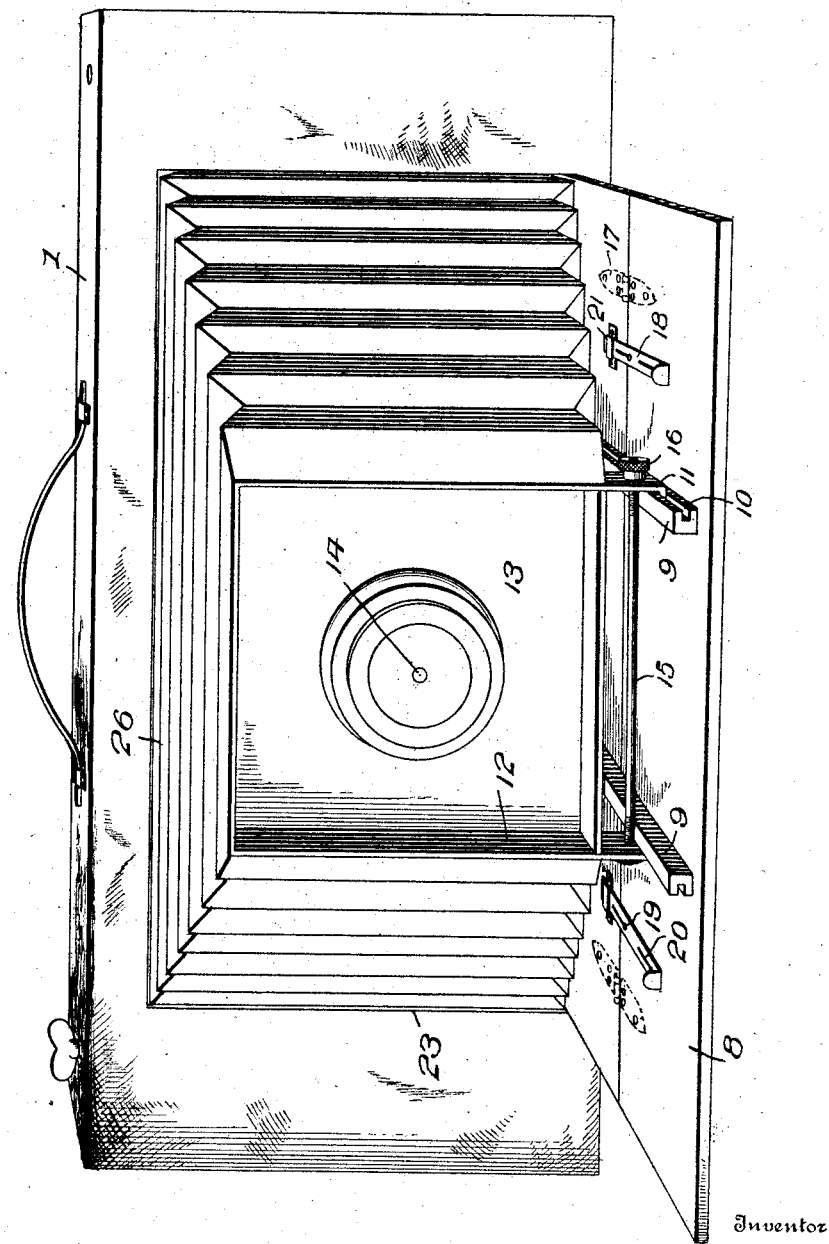
Figure 2:
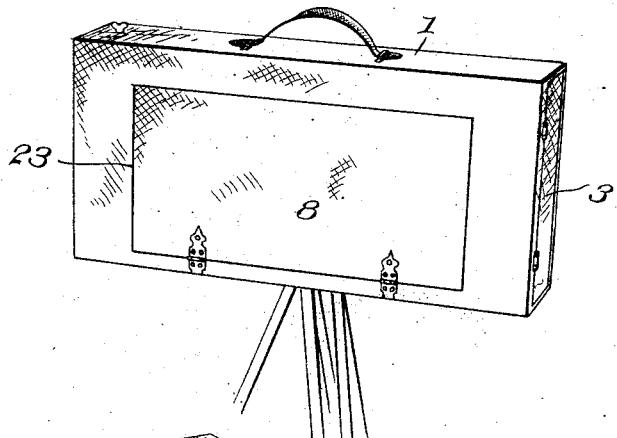
Figure 3:
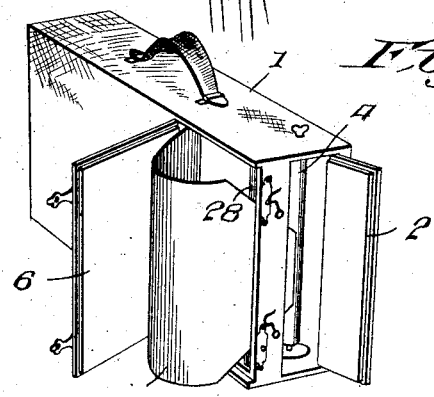
Figure 4:
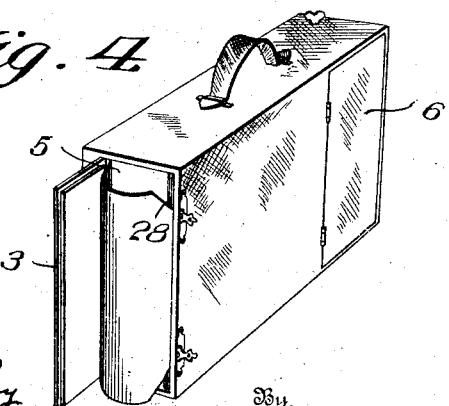

In the accompanying drawings which are made a part of this application, Figure 1 is a perspective view of a camera frame showing my improved attachment secured thereto and the bellows extended to take a picture.
Fig. 2 is a perspective view on a smaller scale of the camera in condition to be transported. Fig. 3 is a perspective view showing the manner of attaching the end of the film to the winding spool. Fig. 4 is a perspective view showing the opposite end of the camera from that shown in Fig. 3 and the manner in which the film is disposed in the rear of the lens, and, Fig. 5 is a diagrammatic view of a camera showing the angle of the rays of light and the position of the several parts of the camera when the lens is extended.

Referring to the drawings in which similar reference numerals designate corresponding parts throughout the several views, 1 indicates the body of the camera which is preferably oblong in general outline and is provided at each end with a door 2 and 3, respectively the door 2 giving access to the winding spool 4 while the door 3 gives access to the storage spool 5.

A door 6 is disposed in one side of the body 1 and at the end thereof containing the winding spool 4, thereby providing additional means for inserting the end of the film 7 into engagement with the winding spool 4. The opposite side of the body 1 is provided with a closure which, when disposed at right angles to the body, forms an extension-bed 8, the inner face of the extension-bed being provided with suitable guides 9 having channels 10 therein in which is adapted to take arms 11, depending from the lens-frame 12. A lens board 13 is movably secured on the rear edge of the lens frame 12 and has centrally disposed therethrough, a lens 14, said lens being preferably of the wide-angle pattern so that when used with my improved camera the rays of light will be extended to substantially 135°.

The lens board is so constructed that it can be adjusted upwardly or downwardly upon the lens frame to obtain the proper focus without moving the bellows.

A rod 15 is disposed through the arms 11 and has each of its ends threaded to receive binding nuts 16 so that when the lens frame has been moved the proper distance outwardly the binding nuts 16 are turned inwardly on the rod 15 and the arms rigidly secured in the channels 10 thereby holding the lens in its adjusted position.

The extension-bed 8 is preferably formed in two sections and secured together by means of hinges or the like 17 so that when desired, the outer portion of the extension-bed may be dropped down and disposed out of line of focus of the lens. When, however, it is desired to move the lens frame to the outer end of the guides 9 the two parts of the extension bed are disposed in the same plane and held rigid with each other by means of plates 18, said plates being secured to the outer portion of the extension bed by means of pins or screws 19 extending through elongated slots 20 in the plates and the inner ends thereof directed into engagement with clips 21 secured to the face of the inner section of the extension bed. By this construction it will be seen that when it is desired to retain the two parts of the extension-bed rigid with each other the plates 18 will be moved into engagement with the clips 21, the slots in the plates allowing said plates to be moved longitudinally and when it is desired to drop the outer end of the extension-bed the plates are removed from engagement with the clips 21 whereupon the outer portion of the extension bed will swing upon its hinges and be disposed out of line of focus.

It will also be understood that the guides 9 are likewise made in two sections, their division point being directly over the division between the two sections of the extension bed.

Each end of the camera is provided with a partition wall 22, said wall being extended at an angle from one corner of the body to the edge of the opening 23 in the front of the body 1, each of the partitions 22 being provided with an off-set portion 24 to form recesses for the reception respectively of the winding spool 4 and storage spool 5, the recesses being so located that the spools are disposed near the front face of the body 1 and substantially in the corners thereof, and by so disposing the spools the rear end of the walls 22 may be disposed directly into the rear corners of the body 1 thereby exposing more of the surface of the film.

At the opposite side of the walls 22 from that containing the off-sets 24 and in line therewith, are shoulders 25 to which is secured the inner ends of the folding bellows 26, the opposite end of the bellows being disposed around the lens frame 12 and secured near the front edge thereof and by referring more particularly to Fig. 5 of the drawing it will be seen that the bellows is disposed out of line of the rays of light, the light rays being indicated by dotted lines and numbered 27. It will further be seen that the light rays will extend substantially from end to end of the camera body, also from top to bottom thereof thereby enabling me to produce a picture covering a greater space than would be possible with the cameras as used at the present time.

In panoramic cameras as now constructed it has been found that to a certain extent a portion of the lines produced are distorted while with my improved construction every line in the picture will be perfectly straight and without any portion of the picture being distorted and it will also be seen that these results are obtained without swinging the lens from side to side, the film being extended in a straight line from end to end of the camera body.

Each of the partition walls 22 is provided with a roller 28 over which the film travels from the storage spool to the winding spool thereby directing the film around the end of the walls without undue friction thereon.

In placing the film in the camera the storage spool 5 containing the roll of film is disposed in the camera body through that end of the body containing the door 3 after which the end of the film is directed around the roller 28 at this end of the camera body as best shown in Fig. 4 and moved along the rear face thereof until the film can be engaged through the opening made by the door 6 and is then directed around the roller 28 at the opposite end of the camera body and into engagement with the winding spool 4, as best shown in Fig. 3 of the drawing. After the film is properly secured to the winding spool 4 the doors 2, 3 and 6 are closed and the film disposed on the winding spool 4 by rotating the same until the designating numeral on the film is disposed in line with an observation glass 29 in the rear of the camera frame.

When it is desired to take a picture the door forming the extension bed 8 is extended at right angles to the camera body and is held in this position by any suitable means after which the lens frame 12 is moved outwardly on the guides 9 and secured in position thereon, the moving of the lens frame outwardly extending the bellows 26.

If the picture is being taken close to the camera, the lens frame is extended into engagement with that portion of the guides carried by the outer end of the extension bed and properly adjusted thereon, while if the picture is being taken at a shorter range, the outer end of the extension bed 8 is lowered by releasing the plates 18 from the clips 21, the lens frame being moved inwardly on its guides until it is free from the outer portion of the extension bed.

After the pictures have been taken the lens frame is again disposed within the camera and the extension-bed directed upwardly and made to occupy the space formed by the opening 23 thereby entirely inclosing the photographic parts of the camera and providing a case therefor.

It will now be seen that I have provided a camera which is light and durable in construction and one wherein a picture of large dimensions may be taken without increasing the size and weight of the camera and I accomplish this result by disposing the storage spools in a position so that the partition walls between the spools and the remainder of the camera may be disposed at an angle to expose a greater portion of the film to the rays of light in conjunction with placing the lens in a frame and disposing the bellows out of line of the light rays.

What I claim is:

1. A camera of the class described comprising a body, said body having an enlarged opening in one side thereof, an extension-bed adapted to fit into said opening and formed in hinged sections, means for holding said sections rigid in their distended position, guides on said extension-bed, a frame adapted to be adjustably held on said guides, partition walls in each end of said body, said walls being disposed at an angle and extending from the ends of said opening to the rear corners of the body, off sets in said walls, said off sets forming recesses, a bellows disposed between said partition walls and said frame, a lens mounted on said frame, a film disposed from end to end of said body in the rear of said lens and spools disposed in said body between the partition walls and end walls of the body, and near the front face thereof, upon which said film is disposed.

2. A camera of the class described comprising a body portion having partition walls in each end thereof, a roller mounted in each partition wall at the corner, said partition walls being disposed at an angle to the end walls of the body and extending from the ends of an opening in said body to the rear corners thereof, off sets in said partition walls to form recesses, spools disposed in said recesses, a film engaging said spools and adapted to be disposed thereon, a bellows secured at one end to said partition walls, a lens frame secured to the opposite end of said bellows, a lens in said frame and secured to the rear edge thereof, whereby the light rays through said lens will be out of line with the bellows and means to support said lens frame when an exposure is being made.

3. A camera of the class described comprising a body having an opening in one side thereof, a roller mounted in each partition wall at the corner, partition walls at each end of said body at an angle to the end walls of the body and extending from the ends of said opening to the rear corners of said body, a shoulder on the inner face of each of said partition walls, a bellows secured to said shoulders and adapted to extend through said opening, a lens at the outer end of said bellows, an extension bed in hinged sections secured to said body and adapted to close said opening, when the camera is not in use and to form a support for the lens when the camera is in use, and means to dispose a portion of said extension-bed out of line of the rays of the lens.

In testimony whereof I have signed my name to this specification in the presence of two subscribing witnesses.

ISAAC A. BELL.

Witnesses:
JERRY SHEA,
JOSIAH RODGERS.